(12) United States Patent
Lee et al.

(10) Patent No.: US 7,432,892 B2
(45) Date of Patent: Oct. 7, 2008

(54) LIGHT TRANSMISSION CONTROLLING APPARATUS, 2D AND 3D IMAGE DISPLAY APPARATUS HAVING THE SAME AND METHOD OF MANUFACTURING THE SAME

(75) Inventors: Ju-hyun Lee, Seoul (KR); Gee-young Sung, Daegu-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 653 days.

(21) Appl. No.: 11/048,935

(22) Filed: Feb. 3, 2005

(65) Prior Publication Data

US 2005/0168401 A1   Aug. 4, 2005

(30) Foreign Application Priority Data

Feb. 3, 2004   (KR) .................. 10-2004-0006948

(51) Int. Cl.
*G09G 3/34*   (2006.01)
(52) U.S. Cl. .................. 345/84; 345/6; 345/7; 345/8; 345/9; 359/462
(58) Field of Classification Search .................. 345/84, 345/6–9; 359/462
See application file for complete search history.

(56) References Cited

U.S. PATENT DOCUMENTS 6,284,352 B1   9/2001   Biegelsen et al.

FOREIGN PATENT DOCUMENTS

| JP | 48-74854 | 10/1973 |
|---|---|---|
| JP | 3-47508 | 5/1991 |
| JP | 03-119889 | 5/1991 |
| JP | 04-112273 | 4/1992 |
| JP | 08-068961 | 3/1996 |
| JP | 2000-187253 | 7/2000 |
| JP | 2002-169105 | 6/2002 |

OTHER PUBLICATIONS

Japanese Office Action dated Apr. 1, 2008.

*Primary Examiner*—Richard Hjerpe
*Assistant Examiner*—Leonid Shapiro
(74) *Attorney, Agent, or Firm*—Buchanan Ingersoll & Rooney PC

(57) ABSTRACT

A light transmission controlling apparatus including: a transparent substrate which has first regions at a predetermined interval, the first regions allowing light to always transmit therethrough; a light screen material and a light transmission material which are independently provided in the transparent substrate and shift between the first regions; and a control unit which controls the shift of the light screen material and the light transmission material.

71 Claims, 12 Drawing Sheets

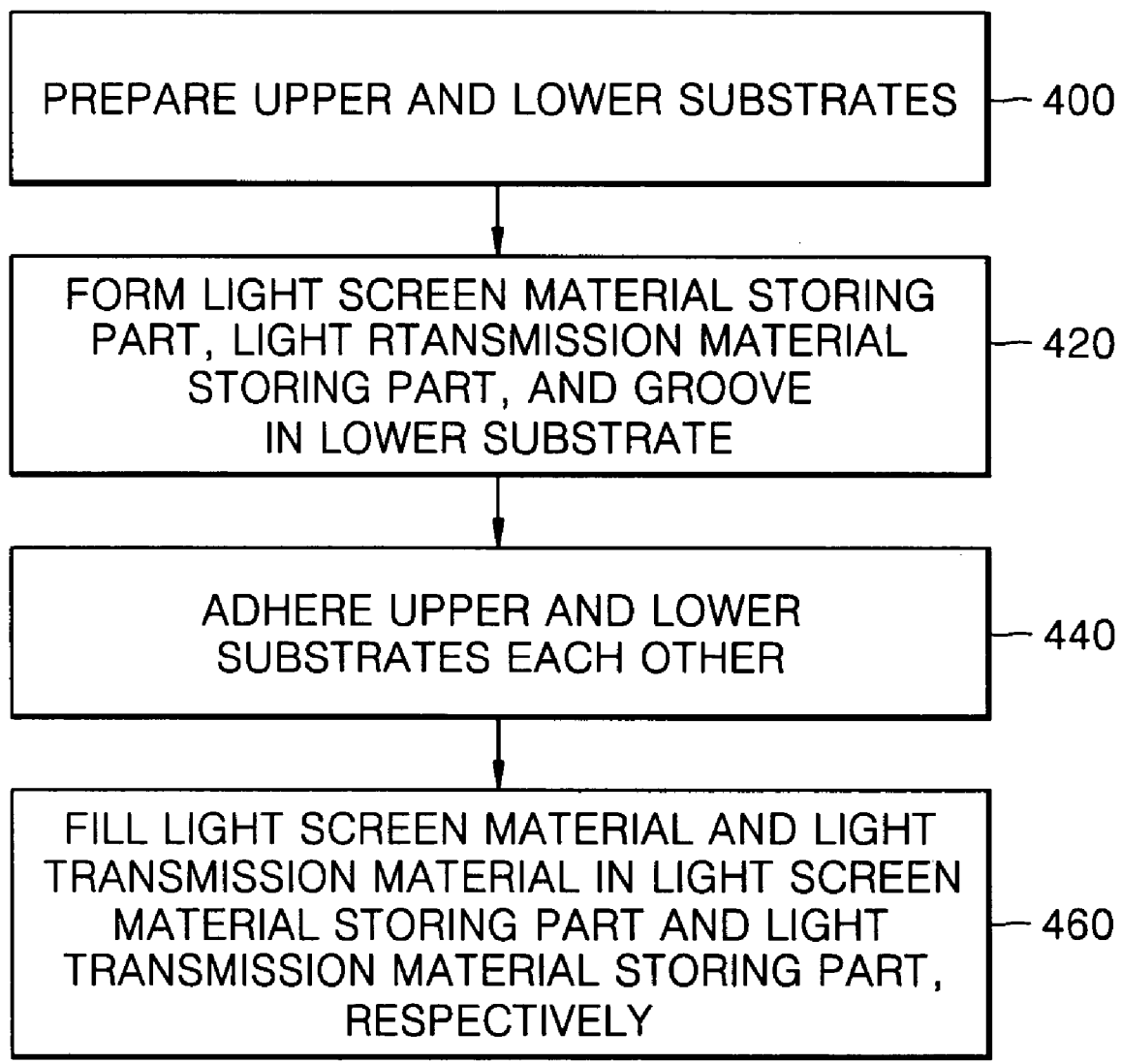

LIGHT TRANSMISSION CONTROLLING APPARATUS, 2D AND 3D IMAGE DISPLAY APPARATUS HAVING THE SAME AND METHOD OF MANUFACTURING THE SAME

BACKGROUND OF THE INVENTION

Priority is claimed to Korean Patent Application No. 10-2004-0006948, filed on Feb. 3, 2004, in the Korean Intellectual Property Office, the disclosure of which is incorporated herein in its entirety by reference.

1. Field of the Invention

The present invention relates to an image display apparatus in which two-dimensional (2D) and three-dimensional (3D) images can be selectively displayed, and more particularly to a 2D and 3D image display apparatus having the same and a method of manufacturing the light transmission controlling apparatus.

2. Description of the Related Art

In general, a 3D image can be implemented using a viewer's binocular disparity. As the 3D image implementing method using the binocular disparity, there are a method where a viewer wears glasses for displaying the 3D image such as polarization glasses and liquid crystal (LC) shutter glasses, and a method where the viewer observes in his/her naked eyes using a unit having a lenticular lens, a barallax barrier, a barallax illumination and the like. The former is called "stereoscopy method" and the latter is called "autostereoscopy method".

The stereoscopy method is applied to a place where several persons can view the image using a polarization projector, such as a theater. The autostereoscopy method is applied to a game display, a home television set, an exhibition display and the like, which are used by a single person or a small number of people.

Current study is concentrated on the implementing the 3D image using the autostereoscopy method, and several products relating to this are on sale.

3D-image display devices, which are being currently introduced, can implement only a 3D image, and are at a higher price than a 2D-image display device.

However, since 3D image contents are not widely available in large quantity, the high-priced 3D-image display devices cannot satisfy customers' interest.

Accordingly, as recent studies are being made on methods for manufacturing a display device for selectively implementing both 2D and 3D images, various products are being introduced.

Among the recently introduced products, there is a display for selectively displaying the 2D and 3D images using a liquid crystal shutter provided at a rear of a Thin Film Transistor Liquid Crystal Display (TFT-LCD). The display has an excellent 2D/3D-image variable characteristic. However, due to a thickness of the liquid crystal shutter, the display is increased in thickness. Further, since the display uses a polarizer film, it is difficult to achieve light efficiency as desired.

FIG. 1 illustrates a conventional 3D-image exclusive display apparatus employing a parallax illumination way.

Referring to FIG. 1, the conventional 3D-image exclusive display includes a general Liquid Crystal Display (LCD) 10 for displaying an image thereon, and a slit plate 14 installed at a rear of the general LCD 10. The slit plate 14 is spaced apart from the LCD 10 by a predetermined distance (dS). A plurality of slits 16 are provided on a surface of the slit plate 14 facing with the LCD 10. Light incident on the slit plate 14 is incident on the LCD 10 through the slits 16. Accordingly, the slits 16 are a line source for the LCD 10. In FIG. 1, reference numeral 12 represents a pixel of the LCD 10.

The 3D-image exclusive display apparatus shown in FIG. 1 has an advantage in that a structure is simple, and luminance is not only excellent, but also Moire interference is apparent in comparison to the display apparatus employing a parallax barrier way.

However, since the 3D-image exclusive display apparatus shown in FIG. 1 employs a fixed 3D display using a fixed slit plate, the viewer can view only the 3D image in which left and right images are separated. For all that, as described above, since the 3D contents are not widely distributed in large amounts at present, and it is expected that the 2D and 3D contents coexist if only in the future for the present, it will not easy for a customer to willingly purchase the high-priced 3D-image exclusive display apparatus.

Accordingly, a display apparatus for selectively displaying the 2D image and the 3D image (Hereinafter, referred to as "2D/3D display apparatus") is required.

FIG. 2 illustrates a conventional 2D/3D display apparatus being currently popularized. In FIG. 2, a reference numeral A1 denotes a liquid crystal panel for displaying the image thereon using a thin film transistor as a switch element.

Referring to FIG. 2, a liquid crystal shutter A2 is provided at a rear of the liquid crystal panel A1, and a light source A3 is provided at a rear of the liquid crystal shutter A2. The light source A3 is a backlight used for the general LCD. An operation principle of the liquid crystal shutter A2 is identical with that of the liquid crystal panel A1. Accordingly, an electric signal applied to the liquid crystal shutter A2 is controlled to allow a specific region of the liquid crystal shutter A2 to function as a transmission region through which an incident light from the light source A3 passes, or to function as a screen region by which the incident light is screened. Further, the electric signal applied to the liquid crystal shutter A2 is controlled to allow a region of the liquid crystal shutter A2 corresponding to the slit 16 of the display apparatus shown in FIG. 1 to function as the transmission region, and to allow a remaining region of the liquid crystal shutter A2 to function as the screen region. In case that the liquid crystal shutter A2 is driven as above, the 2D/3D display apparatus shown in FIG. 2 becomes identical with the 3D image exclusive display apparatus shown in FIG. 1.

In the meanwhile, the electric signal applied to the liquid crystal shutter A2 is controlled to allow an entire region of the liquid crystal shutter A2 to function as the transmission region. In this case, the 2D/3D display apparatus shown in FIG. 2 becomes essentially identical with a 2D image display apparatus.

As such, the conventional 2D/3D display apparatus shown in FIG. 2 has an advantage in that since the liquid crystal shutter A2 can be used to selectively implement a 2D-image exclusive light source and a 3D-image exclusive light source, the 2D or 3D image can be selectively embodied.

However, the 2D/3D display apparatus shown in FIG. 2 has disadvantages in that the display apparatus can be increased in thickness and its manufacture cost can be also increased due to the liquid crystal shutter A2 provided between the liquid crystal panel A1 for displaying the image thereon and the light source A3, and further the light efficiency is reduced due to the necessity of inserting an additional polarizer film.

An observation distance (L) necessary for observing the 3D image is given in the following Equation 1.

$$L = (d \times E)/p \qquad \text{[Equation 1]}$$

In the Equation 1, "L" represents a distance from the liquid crystal panel A1 to viewer's eyes 26L and 26R, and "d"

represents a distance from the liquid crystal shutter A2 to the front surface of the liquid crystal panel A1. Additionally, "E" represents a distance between viewer's left eye 26L and right eye 26R, and "p" represents a pixel pitch of the liquid crystal panel A1.

Generally, the pixel pitch (p) of the liquid crystal panel A1 is about 110 μm, and the distance (E) between both eyes 26L and 26R is about 65 mm. Additionally, considering that a rear glass plate of the liquid crystal panel A1 has a thickness of about 0.7 mm, a polarizer has a thickness of 0.2 mm, and the glass plate of the liquid crystal shutter A2 has the thickness of 0.7 mm, the distance (d) is calculated as 1.6 mm. This distance (d) should be converted into air thickness since the image reaches the viewer through air. For this, the distance 1.6 mm is divided by 1.52. If these values are applied to the Equation 1, the observation distance (L) necessary for observing the 3D image is about 622 mm {(((0.7 mm+0.2 mm+0.7 mm)/1.52)*65 mm)/0.11 mm}.

Referring to FIG. 3, the liquid crystal panel A1 includes a first polarizer 50, a first transparent substrate 52, a first Indium-Tin-Oxide (ITO) electrode 54 connected to the TFT, a first liquid crystal layer 55, a second ITO electrode 58 used as a common electrode, a second transparent substrate 60 and a 135° polarizer 62, which are arrayed in a sequence. Additionally, the liquid crystal shutter A2 includes a third transparent substrate 70, a third ITO electrode 72 connected to the TFT, a liquid crystal layer 74, a fourth ITO electrode 76 used as a common electrode, a fourth transparent substrate 78 and a second polarizer 80, which are arrayed in a sequence from the liquid crystal panel A1 toward a light source A3. When the liquid crystal shutter A2 is in an on state, the incident light from the light source A3, that is, the backlight passes through the liquid crystal shutter A2 as it is, and when the liquid crystal shutter A2 is in an off state, a polarization direction of the incident light is rotated by 90°.

Considering the case that a personal LCD monitor is used as the 2D/3D display apparatus, the observation distance (L) is a long distance if the user is observing with hands placed on a keyboard. Further, it would be advantageous if the observation distance (L) were smaller in instances that the 2D/3D display apparatus is applied to a personal mobile terminal such as a hand phone and a Portable Digital Assistant (PDA). Accordingly, in this aspect, it is difficult that the 2D/3D display apparatus shown in FIG. 2 is applied to the personal LCD monitor or the personal mobile terminal. Naturally, this drawback can be solved by overcoming a difficulty in the manufacturing process to permit the use of a heavy thin glass plate or a polymer substrate. However, since the liquid crystal shutter A2 of the 2D/3D display apparatus shown in FIG. 2 necessarily requires a polarizer film, it is difficult to achieve the desired light efficiency.

In the meanwhile, reference numerals L and R of FIG. 2 represents pixels of the liquid crystal panel A1. An image of a slit light source 22a seen through the pixel (L) is incident only on the viewer's left eye 26L, and the image of the slit light source 22a seen through the pixel (R) is incident only on the viewer's right eye 26R. Accordingly, disparity is generated and the viewer views the 3D image.

As the observation distance and the light efficiency for the 3D image become important factors, various 2D/3D display apparatuses are introduced for improving them. FIG. 4 illustrates one example.

The 2D/3D display apparatus shown in FIG. 4 sequentially includes a patterned retarder A5 which is called a phase difference plate and a liquid crystal shutter A4 between the liquid crystal panel A1 for displaying the image thereon and the light source A3 for the purpose of shortening the observation distance. Arrows in the retarder A5 denotes a fast axis.

When the polarization axis of the incident light incident on the retarder A5 is parallel with or is vertical to the fast axis of the retarder A5, the incident light passes through the retarder A5 as it is. However, when the polarization axis of the incident light is angled by 45° with respect to the fast axis, the polarization axis of the incident light is rotated by 90° due to the retarder A5. The parts of the retarder A5, which are divided in a slit form, have the fast axes angled by 45° with one another.

The liquid crystal shutter A4 includes a fifth transparent substrate 90, a fifth ITO electrode 92, a third liquid crystal layer 94, a sixth ITO electrode 96, a sixth transparent substrate 98 and a third polarizer 100, which are arrayed in a sequence from the retarder A5 toward the light source A3. The fifth and sixth ITO electrodes 92 and 96, which are not patterned, are in contact with a front surface of the third liquid crystal layer 94. When the liquid crystal shutter A4 is in an on state, the incident light on the liquid crystal shutter A4 passes through the liquid crystal shutter A4. To the contrary, when the liquid crystal shutter A4 is in an off state, the polarization axis of the incident light is rotated by 45 degrees.

Accordingly, when the liquid crystal shutter A4 is in the on state, there is no light with the polarization axis vertical to the 135° polarizer 62 of the liquid crystal panel A1, that is, the polarization axis of 45° among light passing through the retarder A5. This means that light is incident on the entire surface of the liquid crystal panel A1. Accordingly, the viewer can view the 2D image.

On the contrary, when the liquid crystal shutter A4 is in the off state, the polarization axis of the incident light on the liquid crystal shutter A4 is rotated by 45 degrees. Therefore, light with the polarization axis vertical to the 135° polarizer 62 of the liquid crystal panel A1 among light passing through the retarder A5 becomes a slit form which are spaced apart at a predetermined interval. This means that the incident light on the 135° polarizer 62 of the liquid crystal panel A1 is light separated in the slit form. Accordingly, the viewer can view the 3D image.

The conventional 2D/3D display apparatus uses the liquid crystal shutter having the same construction as the liquid crystal panel. Therefore, the conventional 2D/3D display apparatus is the same as a display apparatus that two liquid crystal panels are practically used. Accordingly, the conventional 2D/3D display apparatus is increased in thickness and power consumption. Further, a light generating part for 2D/3D image of the conventional 2D/3D display apparatus has the polarizer film. Accordingly, the light efficiency of the conventional 2D/3D display apparatus is reduced. Furthermore, the refractive indexes are different from one another when red (R), green (G) and blue (B), which are used to display a colorful image, pass through the retarder A5. Accordingly, color dispersion can be observed in the conventional 2D/3D display apparatus.

SUMMARY OF THE INVENTION

Embodiments of the present invention can provide a light transmission controlling apparatus in which excellent selectivity for 2D and 3D images can be maintained while an observation distance can be reduced, and thickness, power consumption, light loss and color dispersion can be reduced in a 2D and 3D image display apparatus.

Also, embodiments of the present invention can provide a 2D and 3D image display apparatus with a light transmission controlling apparatus.

Further, embodiments of the present invention can provide a method of manufacturing a light transmission controlling apparatus.

According to an aspect of the present invention, there is provided a light transmission controlling apparatus including: a transparent substrate which has transparent regions at a predetermined interval, the transparent regions allowing light to always transmit therethrough; a light screen material and a light transmission material which are independently provided in the transparent substrate and shift between the transparent regions; and a control unit which controls the shift of the light screen material and the light transmission material.

The transparent substrate may be comprised of an upper substrate and a lower substrate. A groove may be provided between the transparent regions, the groove having a larger width than the transparent region and allowing the light screen material and the light transmission material to be shifted thereat. A first pool may be provided in the transparent substrate, the first pool storing the light screen material and being connected to one end of the groove. A second pool may be provided in the transparent substrate, the second pool storing the light transmission material and being connected to the other end of the groove. At this time, at least one of the first and second pools is divided into a plurality of pools.

The first and second pools may be provided to face each other across the transparent region, or on the same side of the transparent region.

The transparent substrate and the upper and lower substrates may be a glass substrate or a polymer substrate.

The groove may be one continuous, zigzag-shaped groove.

The lower substrate may include a first pool for storing the light screen material and a second pool for storing the light transmission material, the transparent region is provided at the lower substrate between the first and second pools, and a groove having one end connected to the first pool and the other end connected to the second pool is provided between the transparent regions.

The lower substrate may include the first pool for storing the light screen material and the second pool for storing the light transmission material, the transparent region is provided at the upper substrate corresponding between the first and second pools, and the groove having one end connected to the first pool and the other end connected to the second pool is provided between the first regions.

At this time, the first and second pools may be provided at one side of the transparent region, and at least one of the first and second pools may be separated in plurality of pools.

The control unit may include a shift body and a knob connected to the shift body, and the shift body may be provided between the light screen material and the light transmission material.

In case where the transparent substrate is comprised of the upper and lower substrates, the control unit may be provided at the lower substrate and may include the shift body and the knob connected to the shift body, and the shift body may be provided between the light screen material and the light transmission material.

The control unit may be provided external to the transparent substrate, and may include a first pressurizing unit which pressurizes the light screen material; a second pressurizing unit which pressurizes the light transmission material; and a driving-force transmitting unit which connects the first and second pressurizing units with each other and which transmits driving force generated from any one of the first and second pressurizing units to the other pressurizing unit.

Further, the control unit may be disposed adjacently to the upper substrate or the lower substrate, and may include the first pressurizing unit which pressurizes the light screen material; the second pressurizing unit which pressurizes the light transmission material; and the driving-force transmitting unit which connects the first and second pressurizing units with each other, and which transmits the driving force generated from any one of the first and second pressurizing units to the other pressurizing unit.

The first pressurizing unit may be comprised of a first rotary roller and a first cam that is moved by the first rotary roller. The second pressurizing unit may be comprised of a second rotary roller and a second cam that is moved by the second rotary roller. The driving-force transmitting unit is a belt.

A gap material may be provided between the light transmission material and the light screen material.

In another aspect of the present invention, there is provided a 2D and 3D image display apparatus including: an image display unit; and a light source unit having a light transmission controlling apparatus which controls light incident on the image display unit to be light for 2D or 3D image, and a light source which irradiates light into the light transmission controlling apparatus, wherein the light transmission controlling apparatus has a transparent substrate which has transparent regions at a predetermined interval, the first regions allowing light to always transmit therethrough; a light screen material and a light transmission material which are independently provided in the transparent substrate and shift between the transparent regions; and a control unit which controls the shift of the light screen material and the light transmission material.

Here, principal features regarding the construction of the light transmission controlling apparatus are the same as suggested above.

In a further another aspect of the present invention, there is provided a method of manufacturing a light transmission controlling apparatus, the method including: dividing a transparent lower substrate into a light-screen material storing part, a groove part and a light-transmission material storing part; respectively providing first and second pools at the light-screen material storing part and the light-transmission material storing part, and providing the groove part with a groove, which has one end connected to the first pool and the other end connected to the second pool, at a predetermined interval; covering the light-screen material storing part, the groove part and the light-transmission material storing part with a transparent upper substrate; respectively filling the first and second pools with the light screen material and the light transmission material; and installing a control unit for controlling the shift of the light screen material and the light transmission material at the front of the upper substrate.

The first and second pools and the groove may be provided using a photolithography process, a mechanical grinding process or an imprinting process.

The groove may have the width larger than the interval between the grooves.

As described above, embodiments of the present invention can have a reduced thickness compared to the above-described prior art, to reduce the viewing distance of the 3D image, and can reduce the power consumption and the light loss, and further can also reduce the color dispersion.

BRIEF DESCRIPTION OF THE DRAWINGS

The above and other features and advantages of the present invention will become more apparent by describing in detail exemplary embodiments thereof with reference to the attached drawings in which:

FIG. 17 is a block diagram illustrating a method of manufacturing a light transmission controlling apparatus according to the first embodiment of the present invention.

DETAILED DESCRIPTION OF THE INVENTION

Figure 1:
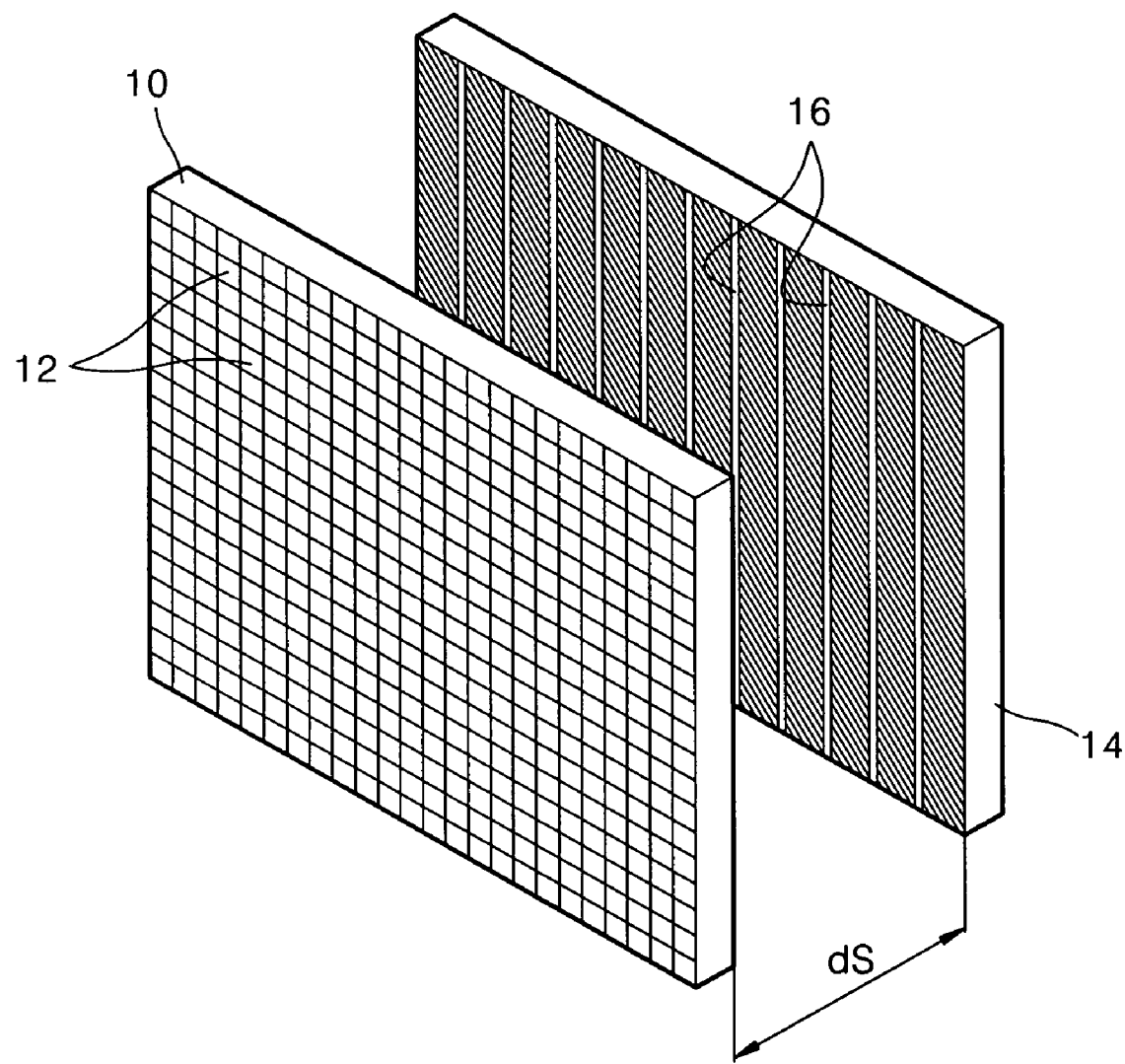
FIG. 1 is a schematic perspective view illustrating a conventional 3D-image exclusive flat panel display apparatus.
Figure 2:
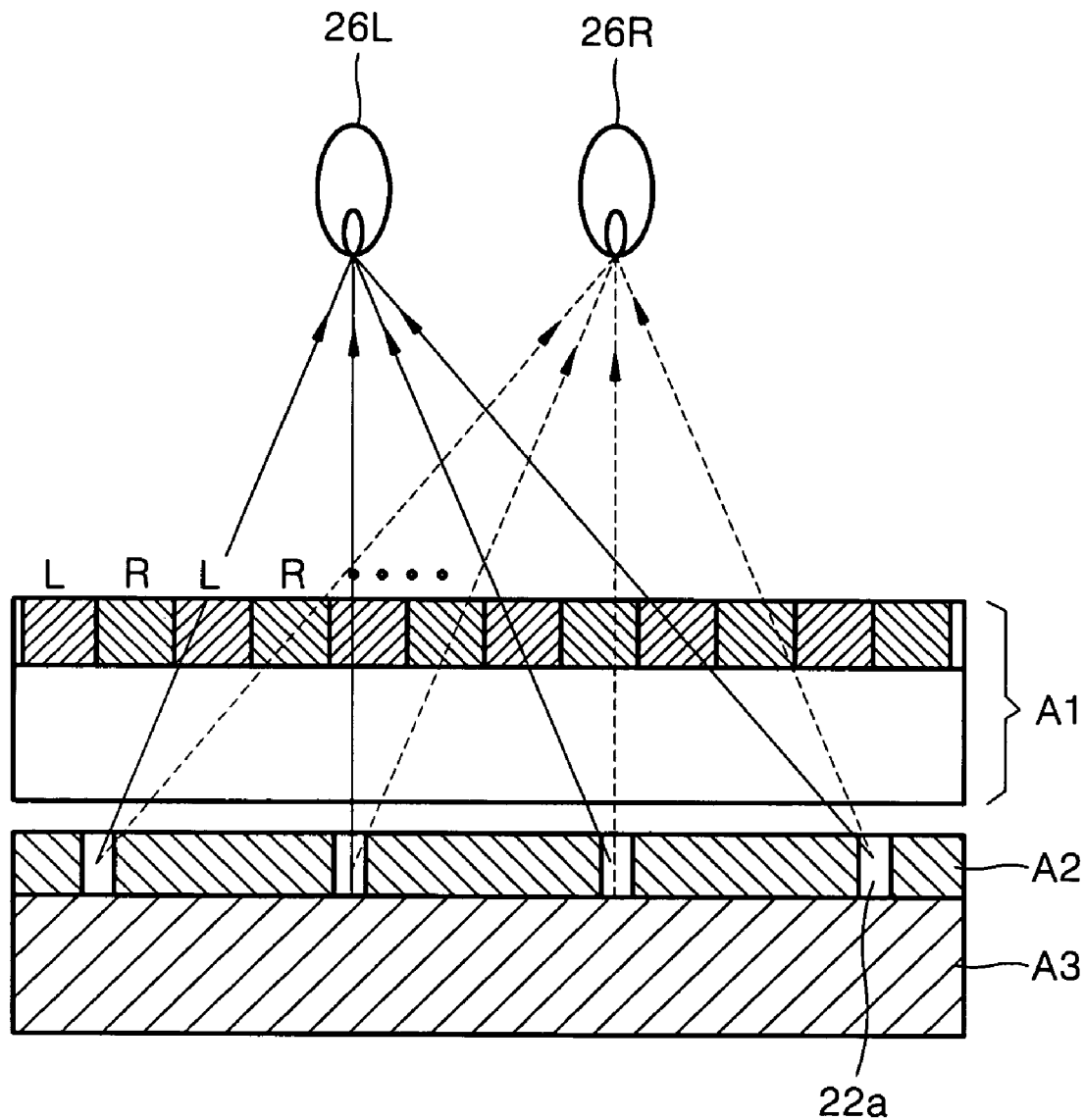
FIGS. 2 and 3 are plan views illustrating a conventional flat panel display apparatus for selectively displaying 2D and 3D images.
Figure 3:
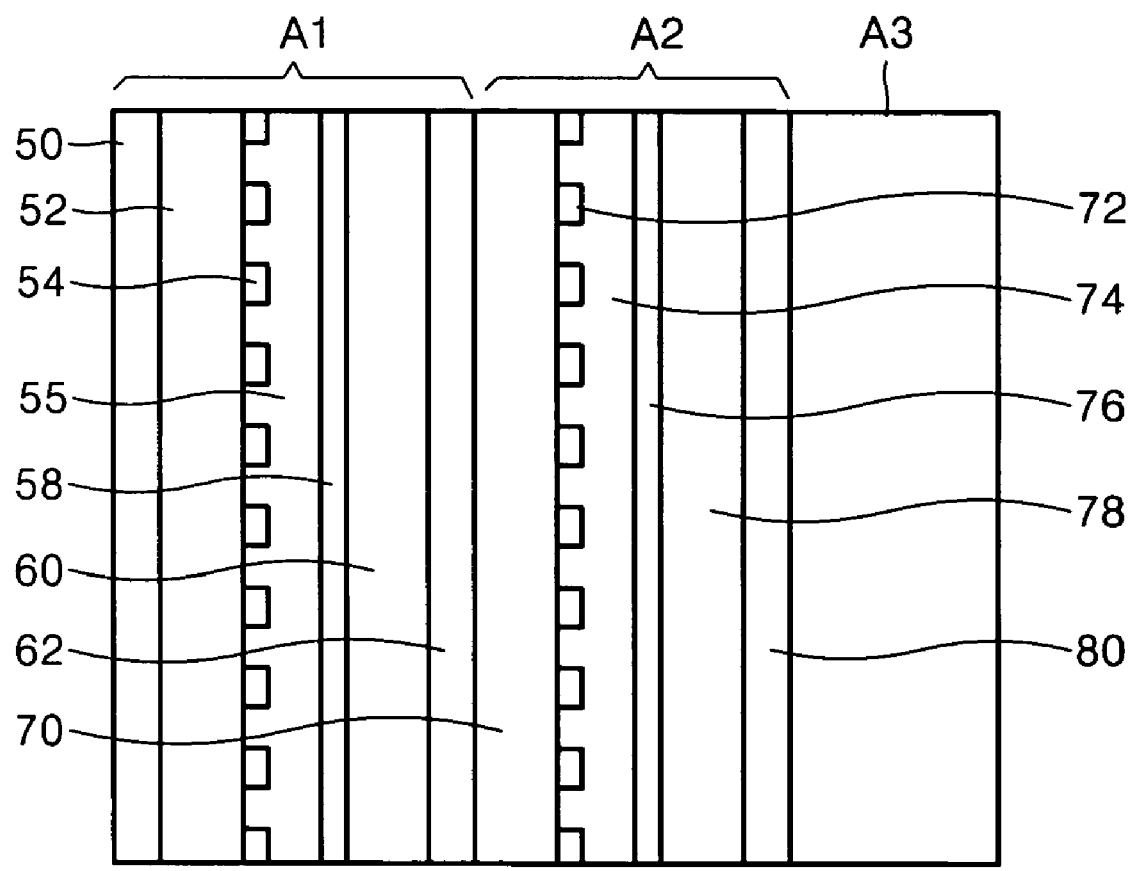
Figure 4:
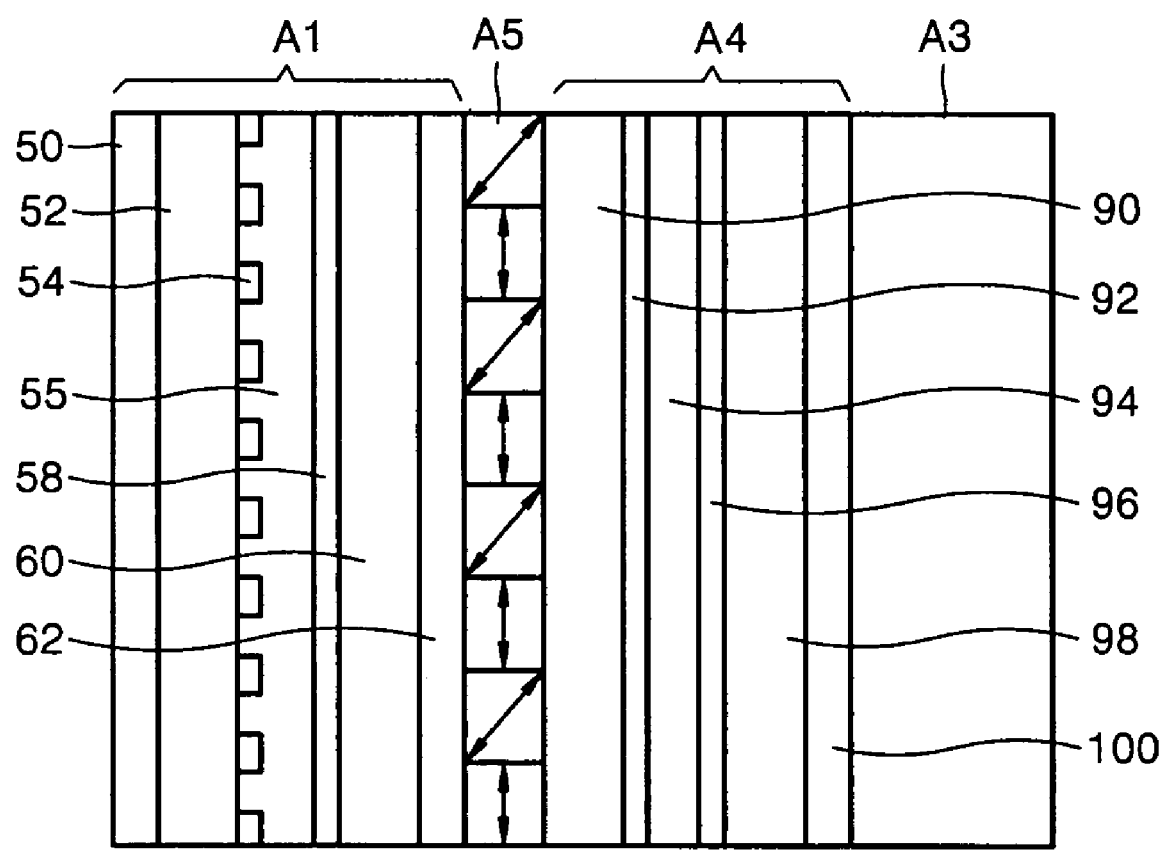
FIG. 4 is a plan view illustrating a conventional flat panel display apparatus with a liquid crystal shutter and a retarder for selectively displaying 2D and 3D images.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layers and regions are exaggerated for clarity. Like reference numerals in the drawings denote like elements, and thus their description will be omitted.

First, a light transmission controlling apparatus according to the first embodiment of the present invention (Hereinafter, referred to as "first controlling apparatus") is now described.

First Embodiment

Figure 5:
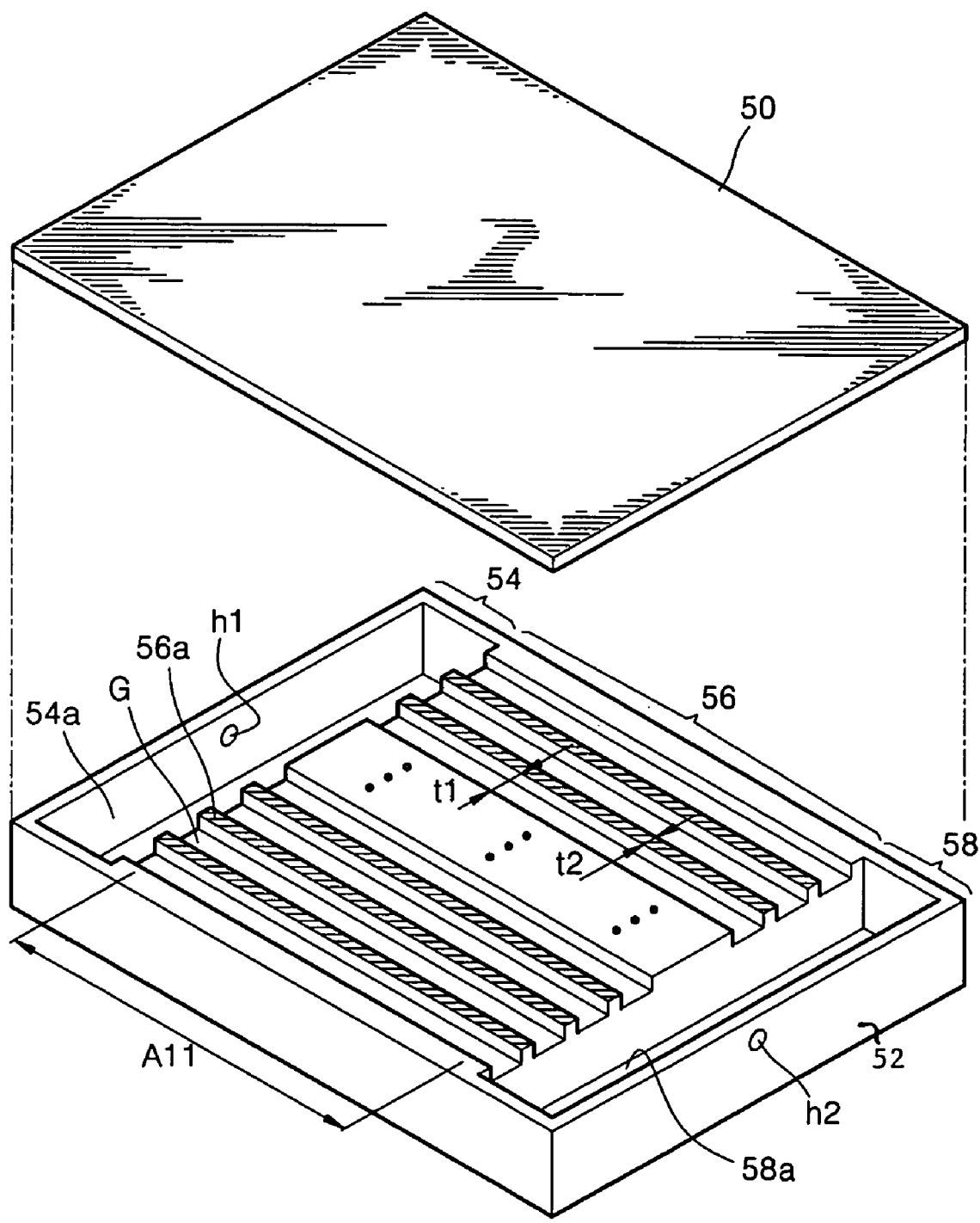
FIG. 5 is a disassembled perspective view illustrating a light transmission controlling apparatus according to the first embodiment of the present invention.

FIG. 5 is a disassembled perspective view illustrating the light transmission controlling apparatus according to the first embodiment of the present invention.

Figure 13:
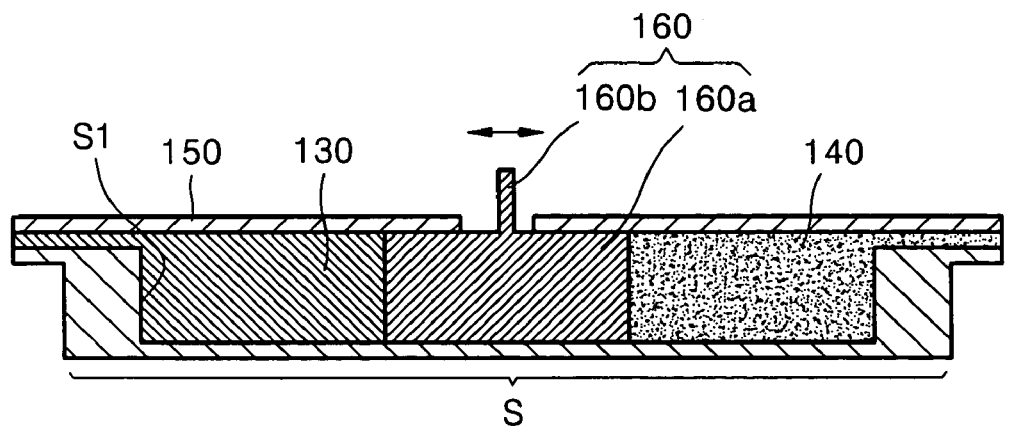
FIG. 13 is a sectional view illustrating a manual control unit provided in a light transmission controlling apparatus according to the present invention.
Figure 14:
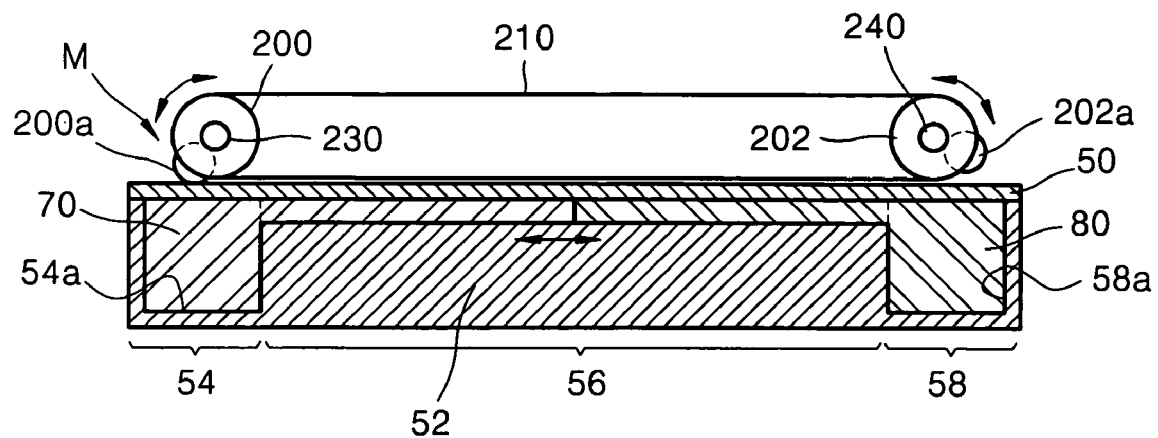
FIG. 14 is a sectional view illustrating an automatic control unit provided in a light transmission controlling apparatus according to the present invention.

The first controlling apparatus includes an upper substrate 50 and a lower substrate 52 as shown in FIG. 5. Additionally, the first controlling apparatus can include a light transmission controlling unit (160 or M) as shown in FIGS. 13 and 14. The light transmission controlling unit 160 or M allows a light screen material or a light transmission material to be supplied to the groove G of the lower substrate 52.

Referring to FIG. 5, the lower substrate 52 with a certain thickness includes a light-screen material storing part 54, a light-transmission material storing part 58, and a groove portion 56. The upper and lower substrates 50 and 52 may be a transparent substrate, for example, a glass substrate or a polymer substrate. The light-screen material storing part 54 has a first pool 54a with a predetermined depth in which the light screen material is stored. The first pool 54a has a wall having a first through-hole h1. After the first pool 54a is filled with the light screen material (not shown) through the first through-hole h1, the first through-hole h1 is sealed. The light screen material, which is liquid-phase material having a large coefficient of light-absorption, may be a low viscous material that is not adhered to the upper and lower substrates 50 and 52 and is not mixed with the light transmission material stored in the light-transmission material storing part 58. The light-transmission material storing part 58 has a second pool 58a in which the light transmission material is stored. The second pool 58a has a wall having a second through-hole h2. After the second pool 58a is filled with the light transmission material through the second through-hole h2, the second through-hole h2 is sealed. The light transmission material may be material having the same transmittance and refractive index and the like as the upper and lower substrates 50 and 52. However, in case where light reflectance does not influence the luminance or the color dispersion of a 2D and 3D image display apparatus at the boundary of the light transmission material and the upper and lower substrates 50 and 52, it is possible to use material with transmittance and refractive index being different from the upper and lower substrates 50 and 52 as the light transmission material. Further, the light transmission material may be the low viscous material that is not adhered to the upper and lower substrates 50 and 52 and is not mixed with the light screen material. Furthermore, the light screen material and the light transmission material may be material without toxicity, if possible.

The groove portion 56 has a plurality of grooves G for connecting the light-screen material storing part 54 with the light-transmission material storing part 58. The plurality of grooves G is spaced away from one another at a predetermined interval. By the existence of the grooves G, a protrusion 56a is naturally provided between the grooves G of the groove portion 56. The protrusion 56a, which can always transmit light, is in contact with the upper substrate 50. The light transmission material or the light screen material is supplied in the groove G.

When light is incident on the bottom surface of the lower substrate 52 or the top surface of the upper substrate 50 in a state where the light screen material is supplied in the groove G, light incident to the groove G is all absorbed by the light screen material, whereas light incident to the protrusion 56a between the grooves G passes through the upper and lower substrates 50 and 52.

As described above, when there is the light screen material in the groove G, the light transmission controlling apparatus of the present embodiment emits light only from the protrusion 56a, not emitting light from the groove G between the protrusions 56a. Accordingly, the light transmission controlling apparatus functions as a slit-shaped light source. At this time, the light transmission controlling apparatus can be identically used as a light source for the 3D image of the 2D and 3D image display apparatus. For this, it is preferable that the groove G may have a width t1 larger than the width t2 of the protrusion 56a. For example, the groove G and the protrusion 56a can have the widths t1 and t2 with a ratio of about 2:1.

In the meantime, in case where the light transmission material is supplied to the groove G from the light-transmission material storing part 58, the incident light on the top surface of the upper substrate 50 or on the bottom surface of the lower substrate 52 passes through the entire region of the groove portion 56 with the groove G and the protrusion 56a because the refractive index of the light transmission material is the same as that of the upper and lower substrates 50 and 52. Therefore, when there is the light transmission material in the groove G, light emits from the entire region of the upper substrate 50 or the lower substrate 52 corresponding to the groove portion 56. Accordingly, the light transmission controlling apparatus of the present invention identically functions as the light source for the 2D image of the 2D/3D image display apparatus.

In FIG. 5, reference numeral A11 denotes the first region of the groove portion 56, which corresponds to a region at which an actual image is displayed in the 2D and 3D image display apparatus. The first region A11 may have a width that is narrower than the groove portion 56. The first region A11 also represents a limit to which material can reach from the light-screen material storing part 54 and the light-transmission material storing part 58.

In other words, the light screen material may be supplied most adjacently to the light-transmission material storing part 58 within a limit where the light screen material is not mixed with the light transmission material since it is not desirable that the light screen material, which is supplied to the groove portion 56 from the light-screen material storing part 54, is mixed with the light transmission material. The boundary of the first region A11, which is disposed adjacently to the light-transmission material storing part 58, is a limit line that the light screen material can be supplied through the groove G.

In the same reason, the boundary of the first region A11, which is disposed adjacently to the light-screen material storing part 54, is a limit line that the light transmission material can reach toward the light-screen material storing part 54 from the light-transmission material storing part 58.

Figure 6:
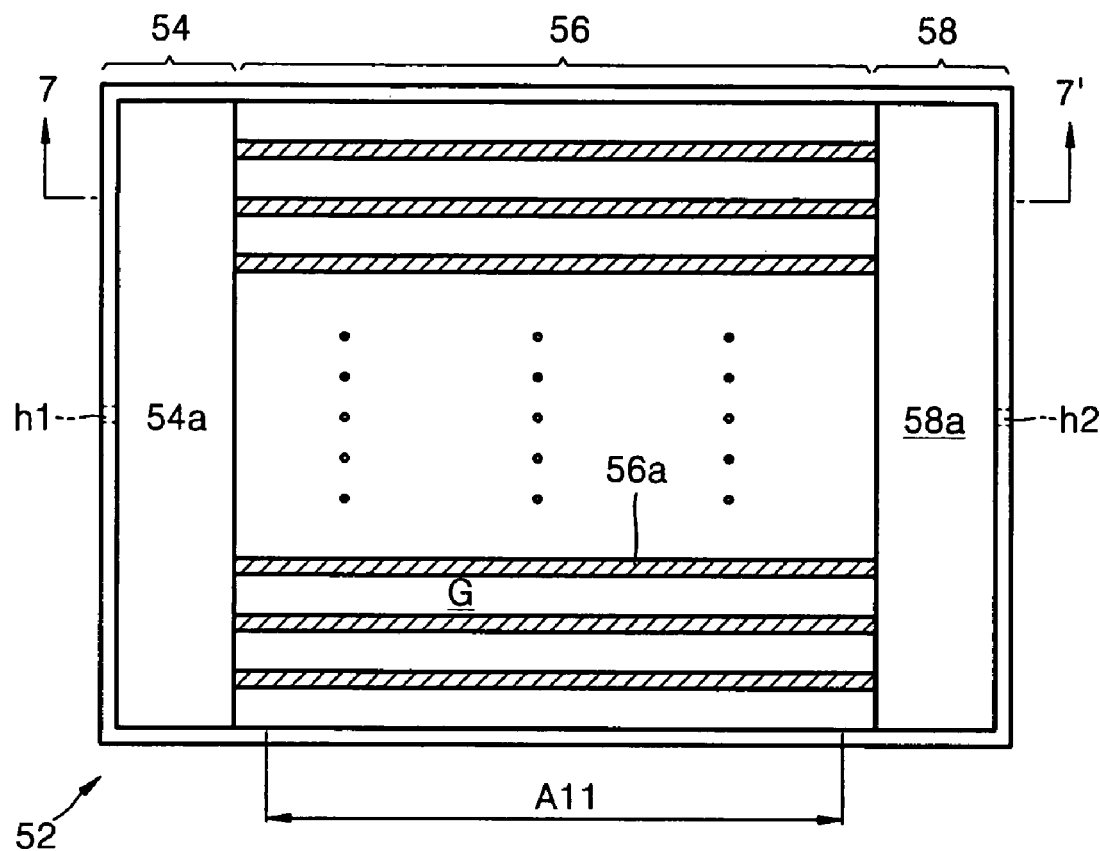
FIG. 6 is a plan view illustrating the lower substrate of the light transmission controlling apparatus of FIG. 5.

FIG. 6 is a plan view illustrating the lower substrate 52 of the first controlling apparatus of FIG. 5.

Figure 7:
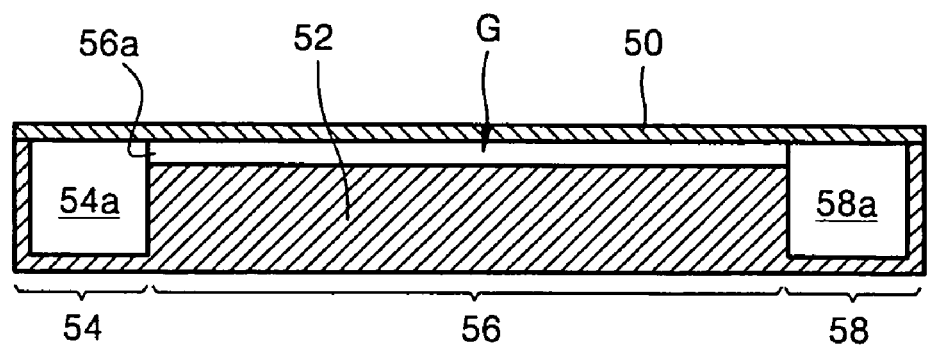
FIG. 7 is a sectional view taken along the line 7-7' of FIG. 6.

FIG. 7 is a sectional view taken along the line 7-7' of FIG. 6, on the assumption that the upper substrate 50 is assembled with the lower substrate 52.

Referring to FIG. 7, the groove G is provided between the upper and lower substrates 50 and 52, and the first pool 54a and the second pool 58a are respectively provided at either end of the groove G of the lower substrate 52.

Figure 8:
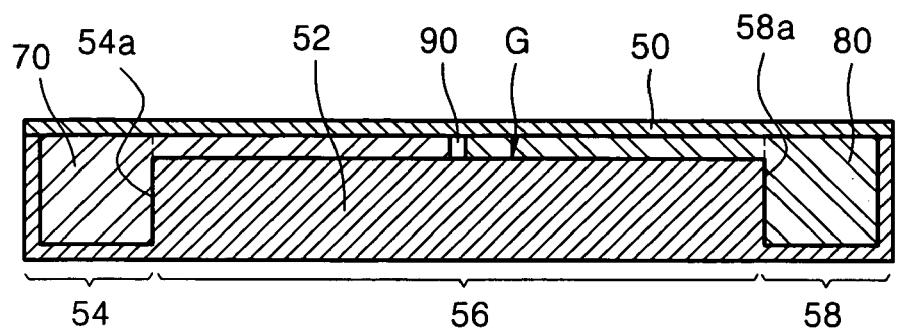
FIG. 8 is a sectional view illustrating a light transmission controlling apparatus of FIG. 7, which is filled with a light screen material and a light transmission material.

FIG. 8 illustrates the first controlling apparatus of FIG. 7, with the first and second pools 54a and 58a being filled with the light screen material 70 and the light transmission material 80, respectively.

Referring to FIG. 8, the groove G of the groove portion 56 is filled with the light screen material 70 and the light transmission material 80. Additionally, a gap material is provided between the light screen material 70 and the light transmission material 80. The gap material 90 functions as a mixture preventing means, which prevents the light screen material 70 from being mixed with the light transmission material 80. The gap material 90 can be air, or material that is not mixed with the two materials 70 and 80 and is not adhered to the upper and lower substrates 50 and 52. Further, in case where the light screen material 70 and the light transmission material 80 are materials such as water and oil which are not mixed with each other or which are rapidly separated from each other although they are mixed for a minute the light transmission material 80, it does not matter that there is not provided the gap material 90.

Figure 9:
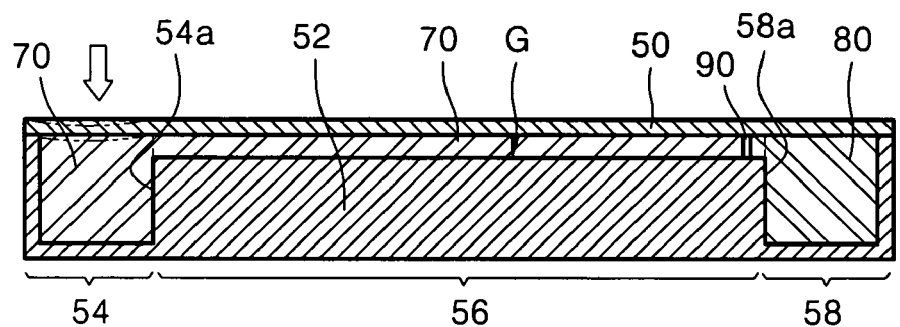
FIGS. 9 and 10 are sectional views illustrating a boundary shift between a light screen material and a light transmission material in a light transmission controlling apparatus of FIG. 8.

FIG. 9 illustrates the first controlling apparatus in which most of the groove portion 56 is filled with the light screen material 70 by pressurizing the first pool 54a through the upper substrate 50. In this case, among incident light on the groove portion 56 of the upper substrate 50 or the lower substrate 52, light incident to the grooves G is absorbed by the light screen material 70 and light incident on the protrusion 56a transmits. Therefore, an inventive first controlling apparatus of FIG. 9 identically functions as a light generating unit including a plurality of slit light sources, which have a width (t2 of FIG. 5) and are spaced apart by the width (t1 of FIG. 5) of the groove G. In other words, the first controlling apparatus of FIG. 9 with the groove G being filled with the light screen material 70 identically functions as the light generate unit for displaying the 3D image in the 2D and 3D image display apparatus.

Figure 10:
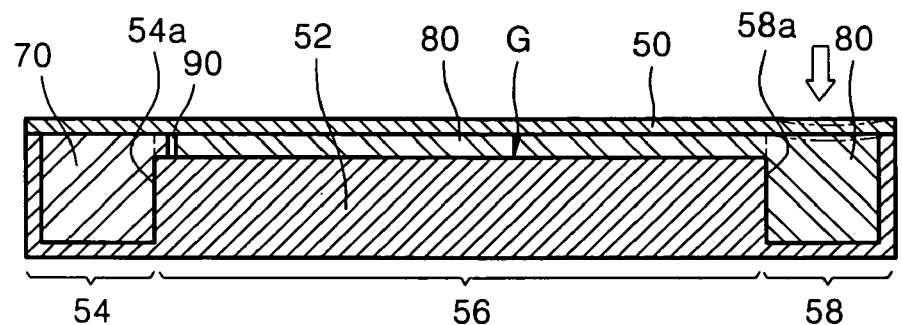

Unlike FIG. 9, FIG. 10 illustrates the first controlling apparatus with most of the groove G being filled with the light transmission material 80. The gap material 90 is shifted up to the vicinity of the light-screen material storing part 54. In this case, incident light on the groove portion 56 passes through the entire region of the groove portion 56. Accordingly, the groove portion 56 functions as one surface light source in all. Therefore, in case where the inventive first controlling apparatus of FIG. 10 includes an image display unit (e.g., a liquid crystal display unit) at any one side, for example, at the upper side of the upper substrate 50, and includes the light source (e.g., a backlight) at the other side, for example, at the lower side of the lower substrate 52, the inventive first controlling apparatus can function as the light source for a 2D image to transmit the incident light from the backlight to the liquid crystal display unit.

Second Embodiment

Figure 11:
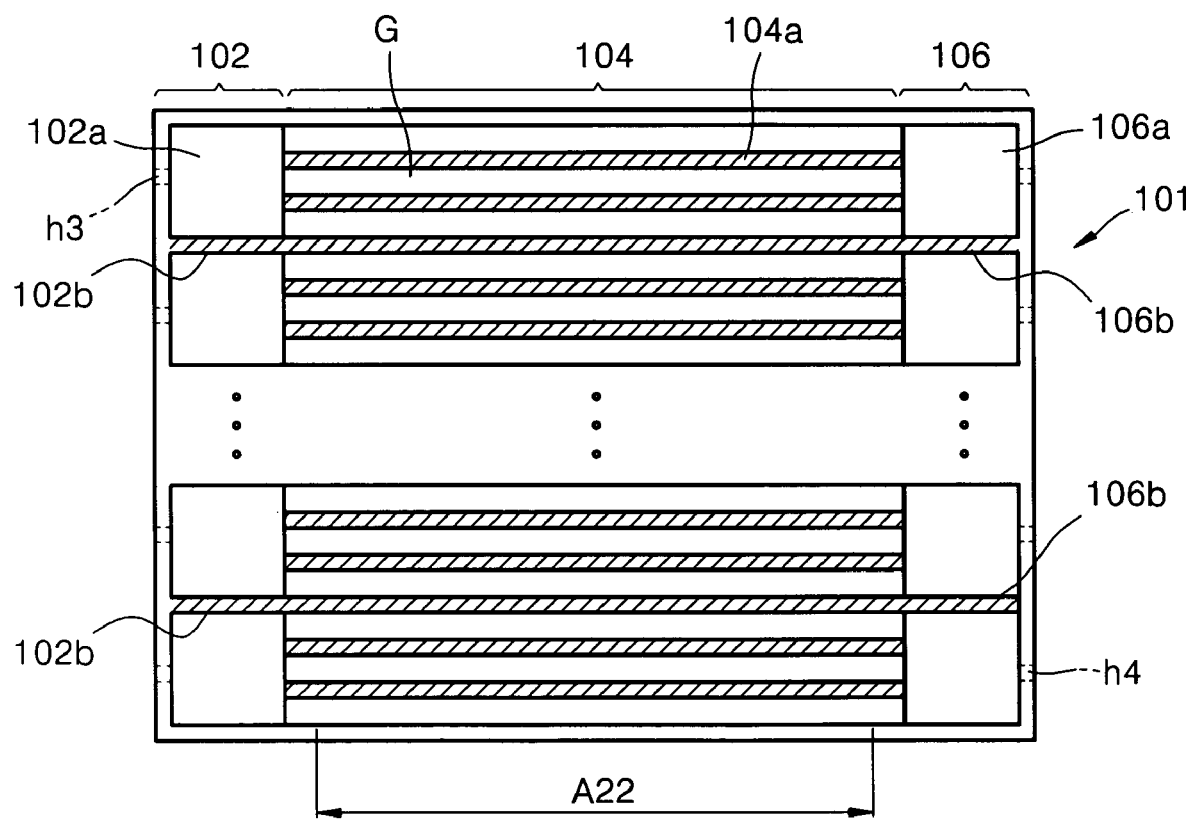
FIG. 11 is a plan view illustrating the lower substrate of a light transmission controlling apparatus according to the second embodiment of the present invention.

A light transmission controlling apparatus according to the second embodiment of the present invention (Hereinafter, referred to as "second controlling apparatus") includes a lower substrate 101 having a light-screen material storing part 102, a groove portion 104 and a light-transmission material storing part 106 as shown in FIG. 11. An upper substrate covering the lower substrate 101 is the same as that of the first embodiment. Accordingly, the upper substrate is not illustrated.

FIG. 11 illustrates the lower substrate of the second controlling apparatus.

Referring to FIG. 11, the light-screen material storing part 102 of the lower substrate 101 has a plurality of third pools 102a with predetermined depths. The light-transmission material storing part 106 of the lower substrate 101 has a plurality of fourth pools 106a with predetermined depths. The plurality of third pools 102a faces with the plurality of fourth pools 106a across the second region A22. The plurality of third pools 102a is separated by a first barrier 102b, and the plurality of fourth pools 106a is separated by a second barrier 106b. The first and second barriers 102b and 106b are formed by extending the protrusion 104a of a groove portion 104 to the light-screen material storing part 102 and the light-transmission material storing part 106. The first and second barriers 102b and 106b may be formed by the extension of the same protrusion 104a. The groove portion 104 has a plurality of grooves G, and the protrusion 104a is provided between the grooves G in this embodiment. The protrusion 104a is in contact with the upper substrate. The groove G and the protrusion 104a may have a ratio of 2:1 in width. The plurality of grooves G are connected to one of the third pools 102a, and the same number of the same grooves G is connected to one of the fourth pools 106a, which faces with one of the third pools 102a. A total number of the third pools 102a or the fourth pools 106a can be the same as that of the grooves G provided at the groove portion 104. That is, one of the third pools 102a or the fourth pools 106a can be connected to one groove G. Further, the number of the grooves G connected to one of the third pools 102a can be different from the number of the grooves G connected to one of the fourth pools 106a. For example, at least two grooves G can be connected to the one of the third pools 102a, and at least three grooves G can be connected to the one of the fourth pools 106a, and vice versa. The second region A22 of the groove portion 104 is the same as the first region A11 of the groove portion 56 of the first embodiment. The third pools 102a and the fourth pools 106a respectively have a third through-hole h3 and a fourth through-hole h4. After the third pools 102a are filled with the light screen material through the third through-hole h3, the third through-hole h3 is sealed. Further, after the fourth pool 106a is filled with the light transmission material through the fourth through-hole h4, the fourth through-hole h4 is sealed.

In the meantime, the third through-hole h3 can be provided only at one side of the light-screen material storing part 102, and the first barrier 102b can have a through-hole (not shown). In the same manner, the fourth through-hole h4 can be provided only at one side of the light-transmission material storing part 106, and the second barrier 106b can have a through-hole (not shown).

Third Embodiment

A light transmission controlling apparatus according to the third embodiment of the present invention (Hereinafter, referred to as "third controlling apparatus") is characterized in that a parallel-shaped groove is provided between a light-screen material storing part and a light-transmission material storing part unlike the first and second controlling apparatuses.

Figure 12:
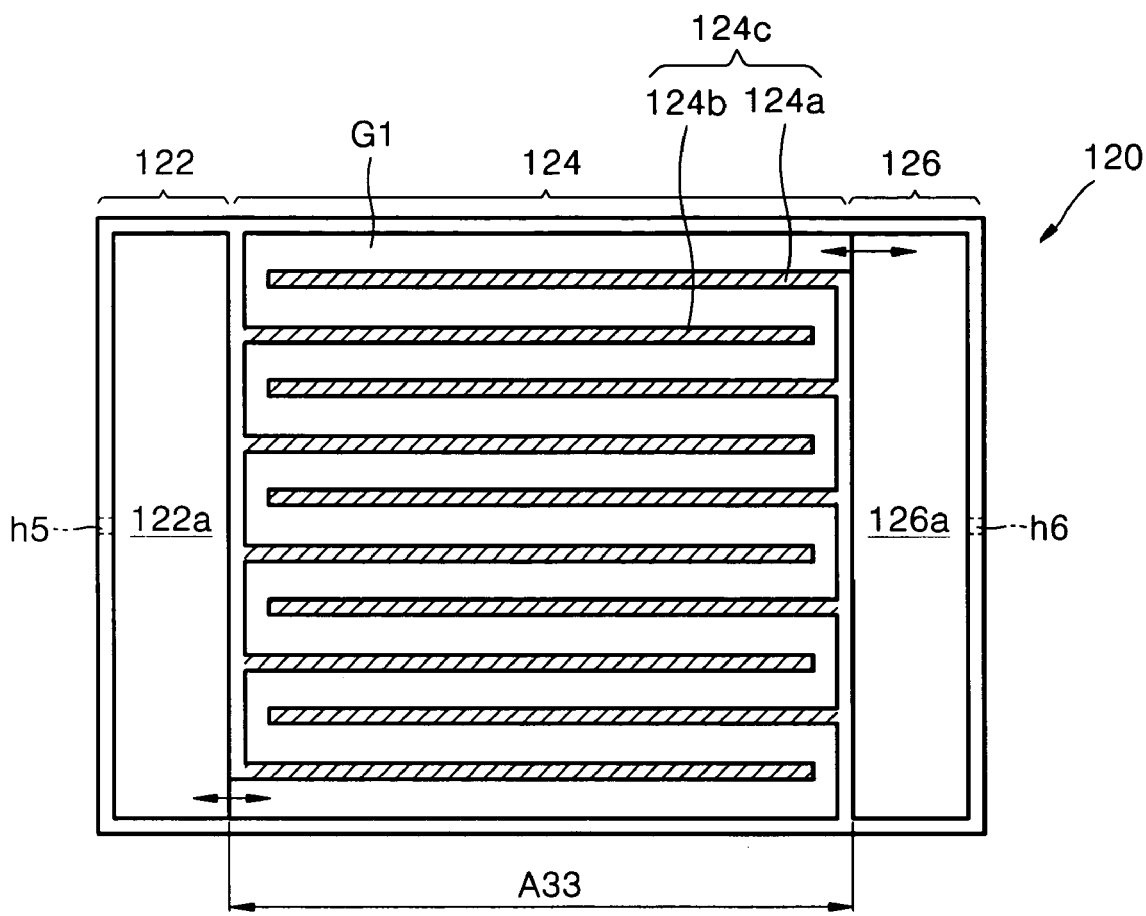
FIG. 12 is a plan view illustrating the lower substrate of a light transmission controlling apparatus according to the third embodiment of the present invention.

In detail, as shown in FIG. 12, the third controlling apparatus includes a lower substrate 120 with a light-screen material storing part 122, a groove portion 124 and a light-transmission material storing part 126. Further, the third controlling apparatus includes an upper substrate (not shown) covering the lower substrate 120. The upper substrate can be the same as that of the first embodiment.

FIG. 12 illustrates the lower substrate of the third controlling apparatus.

Referring to FIG. 12, the light-screen material storing part 122 includes a fifth pool 122a with a predetermined depth, which is filled with the light screen material. A fifth through-hole h5 is provided on a wall surrounding the fifth pool 122a. After the fifth pool 122a is filled with the light screen material through the fifth through-hole h5, the fifth through-hole h5 is sealed. The light-transmission material storing part 126 includes a sixth pool 126a with a predetermined depth, which is filled with the light transmission material. A sixth through-hole h6 is provided on a wall surrounding the sixth pool 126a. After the sixth pool 126a is filled with the light transmission material through the sixth through-hole h6, the sixth through-hole h6 is sealed. The groove portion 124 includes one groove G1 having one end connected to the fifth pool 122a and the other end connected to the sixth pool 126a. Further, the groove portion 124 includes a protrusion 124c contacting with the upper substrate. The protrusion 124c includes a first protrusion 124a and a second protrusion 124b. The first protrusion 124a extends from the light-transmission material storing part 126 toward the light-screen material storing part 122, and the second protrusion 124b extends from the light-screen material storing part 122 toward the light-transmission material storing part 126. The first and second protrusions 124a and 124b may have the same widths. The first protrusion 124a is connected to the light-transmission material storing part 126, but is not connected to the light-screen material storing part 122. To the contrary, the second protrusion 124b is connected to the light-screen material storing part 122, but is not connected to the light-transmission material storing part 126. The first and second protrusions 124a and 124b are alternately disposed in parallel with one another. The groove G1 is provided between the first and second protrusions 124a and 124b. As a result, the groove G1 has a zigzag shape going between the first and second protrusions 124a and 124b. The groove G1 and the protrusion 124c, which is disposed between the grooves G1, may have a predetermined ratio of 2:1 in width, for example. The width of the groove G1 corresponds to a distance between the first and second protrusions 124a and 124b. The third region A33 of the groove portion 124 identically functions as the first region A11 of the first embodiment.

In the meantime, one groove G1 can be divided into at least two grooves. Each of the divided grooves can be connected to the fifth and sixth pools 122a and 126a in the same type as the groove G1 of FIG. 12.

Further, the light-screen material storing part 122 and the light-transmission material storing part 126 can be all disposed at one side. For example, in FIG. 12, the light-screen material storing part 122 can be disposed together at the side of the light-transmission material storing part 126 and the groove portion 124 can be extended toward a light-screen material storing part 122 region, and vice versa.

Various control units and methods can be provided to supply the light screen material or the light transmission material to the groove portions 56, 104 and 124 of the first to third controlling apparatuses, and control the shift of the light screen material or the light transmission material. FIGS. 13 and 14 illustrate one example thereof.

FIG. 13 illustrates a procedure of selectively supplying the light screen material 130 or the light transmission material 140 and controlling the shift of the light screen material 130 or the light transmission material 140 by using a manual control unit 160.

Referring to FIG. 13, one pool S1 is provided at a light-screen material and light-transmission material storing part S. The light screen material 130 and the light transmission material 140 are provided in the pool S1 centering on the control unit 160. The light screen material 130 and the light transmission material 140 are separated using the control unit 160. Reference numeral 150 denotes the upper substrate. The control unit 160 includes a shift body 160a and a knob 160b. The shift body 160a is immersed in the pool S1 to separate the light screen material 130 and the light transmission material 140. The knob 160b is used to move the shift body 160a. The knob 160b is upwardly protruded through the through-hole of the upper substrate 150 for convenient grasp. In order to supply the light screen material 130 or the light transmission material 140 to the groove portion (not shown), the shift body 160a should sufficiently push the light screen material 130 or the light transmission material 140. Accordingly, the through-hole of the upper substrate 150 may be large enough to move the knob 160b. However, it is not desirable that the through-hole be large enough to expose the light screen material 130 or the light transmission material 140 to the external surroundings. The upper substrate 150 of FIG. 13 is a hard type.

FIG. 14 illustrates an automatic control unit (M) provided in the first controlling apparatus (FIGS. 5 through 7).

Referring to FIG. 14, the automatic control unit (M) includes first and second rollers 200 and 202 spaced apart from each other; a belt 210 for transmitting power between the first and second rollers 200 and 202; and first and second cams 200a and 202a respectively associated with the first and second rollers 200 and 202. The first roller 200 is rotated with respect to a first shaft 230, and the second roller 202 is rotated with respect to a second shaft 240. The first roller 200 is spaced apart from and over the upper substrate 50 to face with the first pool 54a that is filled with the light screen material 70. The second roller 202 is spaced apart from and over the upper substrate 50 to face with the second pool 58a that is filled with the light transmission material 80. However, the separation degree of the first and second rollers 200 and 202 from the upper substrate 50 is determined depending on the degree of the contact of the first and second cams 200a and 202a with the upper substrate 50. In other words, the first and second cams 200a and 202a press the flexible upper substrate 50 to supply the light screen material 70 or the light transmission material 80 to the groove portion 56. Accordingly, the first and second rollers 200 and 202 may be spaced apart from the upper substrate 50 such that the first and second cams 200a and 202a can sufficiently press the upper substrate 50 when the first and second rollers 200 and 202 are rotated. Since the light screen material 70 and the light transmission material 80 should be selectively supplied, being not supplied at the same time, the first and second cams 200a and 202a may be disposed at different positions. In other words, when the first cam 200a is positioned to press the upper substrate 50, the second cam 202a may be positioned to space apart from the upper substrate 50.

As shown in FIG. 14, the first and second cams 200a and 202a can be provided on the first and second shafts 230 and 240, but each can have protrusion shapes on the surfaces of the first and second rollers 200 and 202. Further, though not illustrated in FIG. 14, a driving motor can be provided at the first shaft 230 and/or the second shaft 240.

The automatic control unit (M) of FIG. 14 may be positioned out of the groove portion 56. At this time, the first and second pools 54a and 58a may be also extended out of the groove portion 56.

Now, a 2D/3D image display apparatus having the first, second or third controlling apparatus (Hereinafter, referred to as "image display apparatus") is described.

Figure 15:
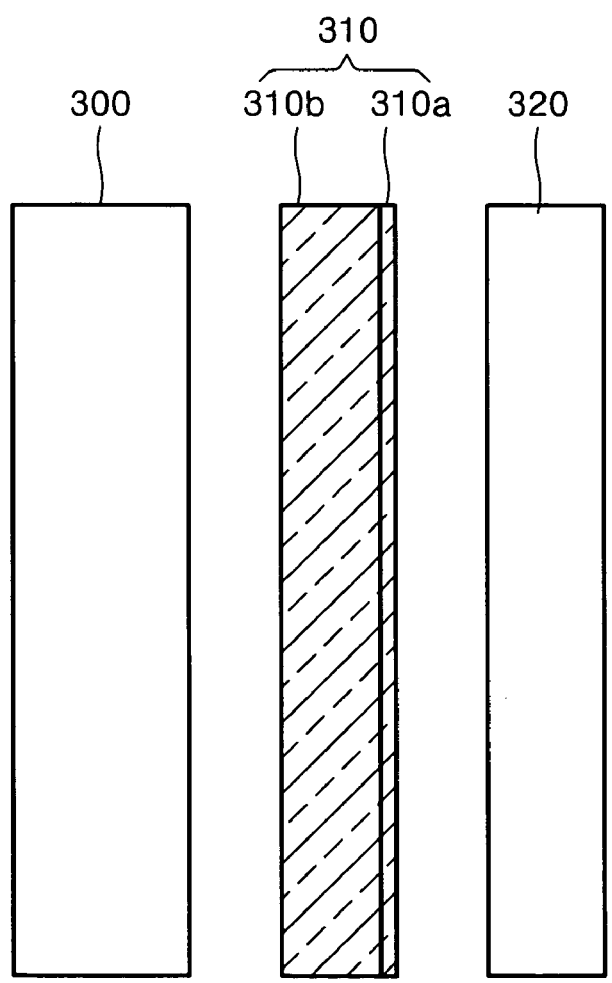
FIG. 15 is a side view illustrating an image display apparatus according to an embodiment of the present invention.
Figure 16:
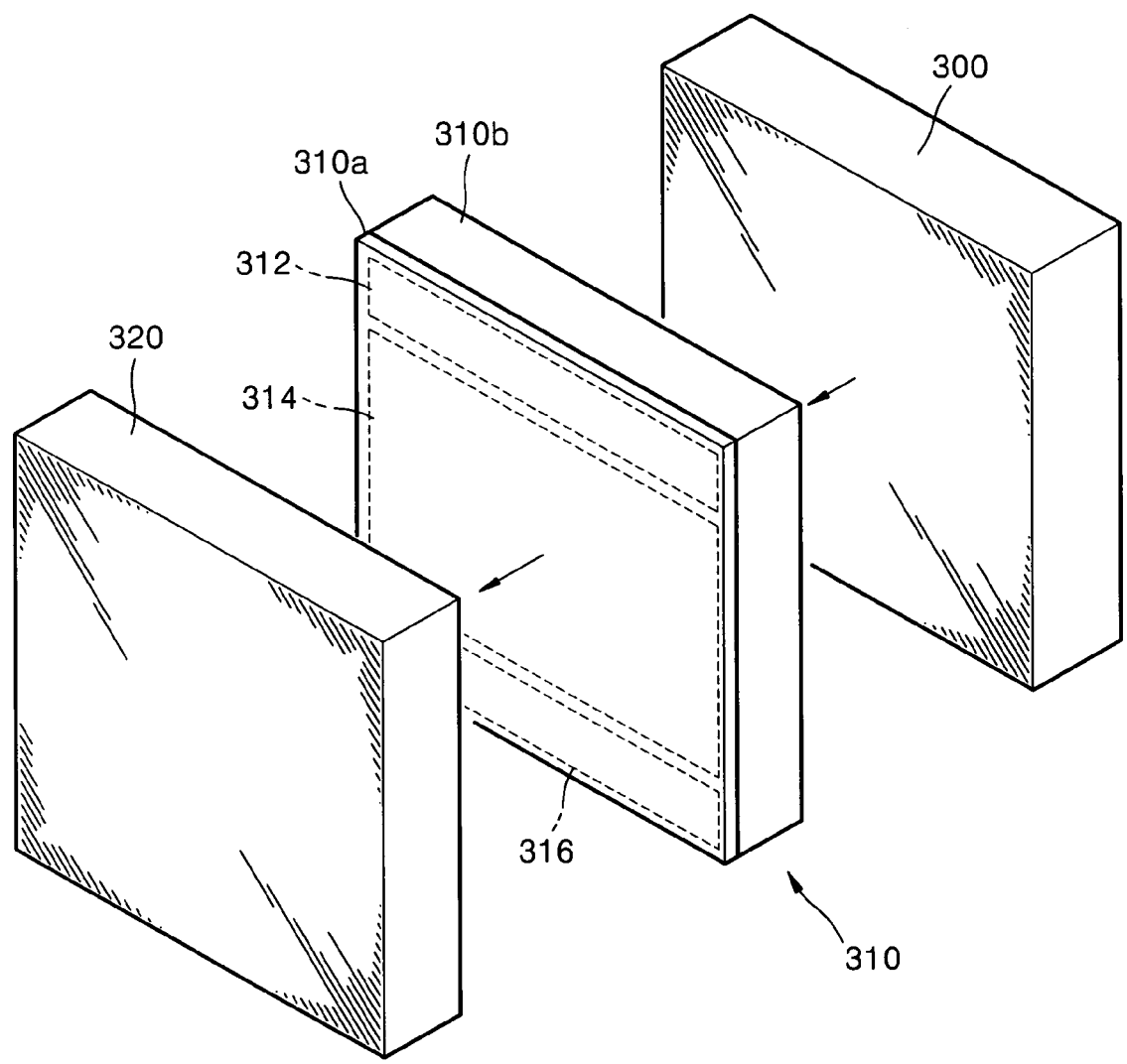
FIG. 16 is a disassembled perspective view illustrating an image display apparatus of FIG. 15.

FIG. 15 is a side view illustrating the image display apparatus according to the present invention, and FIG. 16 is a disassembled perspective view illustrating key parts of the image display apparatus shown in FIG. 15.

Referring to FIGS. 15 and 16, the inventive image display apparatus includes a light source 300, a light transmission controlling apparatus 310, and an image display unit 320. The light source 300 can be a backlight, and the image display unit 320 can be a flat panel display unit, for example, a liquid crystal display unit. The light transmission controlling apparatus 310 includes an upper substrate 310a and a lower substrate 310b. The upper substrate 310a can be a transparent hard or flexible substrate. The lower substrate 310b includes a light-screen material storing part 312, a groove portion 314, and a light-transmission material storing part 316. The light transmission controlling apparatus 310 is used as a light-generating unit for generating light for the 2D and 3D images. The light transmission controlling apparatus 310 uses any one of the above-described first to third controlling apparatuses for instance. Accordingly, the light transmission material is supplied to the groove (not shown) of the groove portion 314, thereby allowing the incident light from the light source 300 to pass through the entire region of the groove portion 314 such that the light transmission controlling apparatus 310 can be used as the light-generating unit for the 2D image. Also, the light-screen material is supplied to the groove (not shown) of the groove portion 314, thereby allowing the incident light from the light source 300 to pass only through a selected region of the groove portion 314 such that the light transmission controlling apparatus 310 can be used as the light generating unit for the 2D image.

A method of manufacturing the above-described first to third controlling apparatuses is described in the following.

The inventive methods of manufacturing the first to third controlling apparatuses are almost the same as one another due to their identical technical spirits. Accordingly, only the inventive method of manufacturing the first controlling apparatus is now described, and the descriptions for the inventive methods of manufacturing the second and third controlling apparatuses are omitted.

Referring to FIGS. 5 and 17, the inventive method of manufacturing the first controlling apparatus includes: preparing the upper and lower substrates 50 and 52 (S400); providing the light-screen material storing part 54, the light-transmission material storing part 58 and the groove portion 56 at the lower substrate 52 (S420); sealing and adhering the upper substrate 50 to the lower substrate 52 (S440); and filling each of the storages 54 and 58 with the light screen material and the light transmission material (S460). The sealing and adhering of the substrates (S420) can be exchanged with the filling of the storages (S440) in sequence. That is, after the storages 54 and 58 are respectively filled with the light screen material and the light transmission material, the upper and lower substrates 50 and 52 can be sealed with each other. In this case, it does not matter that the first and second through-holes h1 and h2, through which the light screen material and the light transmission material are injected into each of the storages 54 and 58, are not provided in the S420.

In more detail, in the preparing of the substrates (S400), all of the upper and lower substrates 50 and 52 can use transparent materials, for example, a glass substrate or a polymer substrate. The upper and lower substrates 50 and 52 may have the same optical characteristic. In case where the manual supply unit 160 is used as shown in FIG. 13, the upper substrate 50 may use the hard substrate. However, in case where the automatic supply unit (M) is used as shown in FIG. 14, the upper substrate 50 may use the flexible substrate. The lower substrate 52 may have a heavier thickness than the upper substrate 50 due to the inclusion of the light-screen material storing part 54, the groove portion 56 and the light-transmission material storing part 58.

Next, in the S420, the light-screen material storing part 54, the groove portion 56 and the light-transmission material storing part 58 are provided at the lower substrate 52. After that, the first pool 54a with the predetermined depth, which is filled with the light screen material, is provided at the light-screen material storing part 54. The second pool 58a, which is filled with the light transmission material, is provided at the light-transmission material storing part 58. The grooves G are provided at the groove portion 56 to be at a predetermined interval. At this time, the first and second pools 54a and 58a and the grooves G can be provided using a photolithography process, a mechanical grinding process, an imprinting process, and the like. Also, the first and second through-holes h1 and h2 can be respectively provided at the first and second pools 54a and 58a. When the grooves G is provided, the grooves G can have the width t1 depending on the pixel pitch of the image display unit (320 of FIG. 16). For example, in case where the image display unit 320 is the liquid crystal display unit, the grooves G can have a width of about 200□, and an interval t2 can have a size of about 100□ between the grooves G, which always transmit light. Further, the grooves G can have a depth of several hundreds of micrometers. Accordingly, in case where the grooves G are filled with the light screen material, a screen region and a transmission region can have a ratio of 2:1 in width. Therefore, the first controlling apparatus can be used as the light source for the 3D image.

In the meantime, when the first pool 54a contacts with the light screen material, the second pool 58a contacts with the light transmission material, and the grooves G contacts with the light screen material or the light transmission material, the first and second pools 54a and 58a and the grooves G may have minimal surface roughness with respect to the light screen and transmission materials so as to minimize adherent force between the light screen and transmission materials, and the first and second pools 54a and 58a and the grooves G, especially, between the grooves G and the light screen and transmission materials.

As described above, the first and second pools 54a and 58a and the grooves G have the minimal surface roughness. Therefore, when the light screen material or the light transmission material is evacuated from the groove G, the materials are not adhered to the surface of the grooves G, thereby providing a good quality of image.

As aforementioned, after the first and second pools 54a and 58a and the grooves G are provided at the lower substrate 52, the upper substrate 50 and the lower substrate 52 are aligned and adherently sealed in the sealing and adhering (S440). At this time, the sealing and adhering can be performed using an anodic bonding process, an optical adhesive process, a thermal laminating process or the like.

After that, in the filling of the storages (S460), the first and second pools 54a and 58a are respectively filled with the light screen material and the light transmission material through the first and second through-holes h1 and h2. At this time, the first and second pools 54a and 58a may be filled with the light screen and transmission materials with the boundary being located at the first region A11 of the groove portion 56. In the filling with the light screen material and the light transmission material, a third material can be inserted as the barrier at the boundary of the two materials. The third material is not mixed with the two materials, and not adhered to the surface of the grooves G and the upper substrate 50. Air can be inserted at the boundary as the third material.

In the meantime, before the upper substrate 50 and the lower substrate 52 are sealed and adhered to each other, the first and second pools 54a and 58a can be respectively filled with the light screen material and the light transmission material. Further, only the light-screen material storing part 54 and the light-transmission material storing part 58 can be provided at the lower substrate 52, and the groove portion 56 can be also provided at the upper substrate 50. In this case, the light-screen material storing part 54 and the light-transmission material storing part 58 may be respectively filled with the light screen material and the light transmission material after the upper substrate 50 and the lower substrate 52 are sealed and adhered to each other.

The above-described inventive method of manufacturing the first controlling apparatus can be applied to the inventive method of manufacturing the image display apparatus of FIGS. 15 and 16.

The inventive method of manufacturing the image display apparatus is described with reference to FIG. 16.

Each of the light source 300, the image display unit 320 and the light transmission controlling apparatus 310 is manufactured individually. At this time, the light transmission controlling apparatus 310 uses any one of the inventive first to third controlling apparatuses, and can be manufactured according to the method of manufacturing the inventive first controlling apparatus. Therefore, the detailed description for the method of manufacturing the light transmission controlling apparatus 310 is omitted.

After that, the light source 300, the image display unit 320 and the light transmission controlling apparatus 310 are aligned and joined to one another. As a result, the inventive image display apparatus is completed.

As described above, the first to third controlling apparatuses do not require a polarizer since light is screened or transmitted using the light screen material and the light transmission material. Therefore, in case where the inventive controlling apparatus is used as the light source for the 2D and 3D images, the 2D and 3D image display apparatus can not only reduce in thickness, but also can reduce a viewing distance for the 3D image and can reduce in light loss and color dispersion.

Further, the inventive controlling apparatuses do not need to be powered all time, such as the conventional light source for the 2D and 3D images, since the light screen material and the light transmission material can be manually or automatically supplied. Therefore, in case where the 2D and 3D image display apparatus employs the inventive controlling apparatuses, the 2D and 3D image display apparatus can reduce in consumption power.

Though not illustrated in the figures, the pools 54, 58, 102, 106, 122, 126 can include biased pistons, elastic bladders or any other suitable means to effectively change the volume of the pools as the screen/light transmission material is pushed into or removed from the pools, particularly when the materials are relatively uncompressible. Alternatively, air or other compressible gas or gasses can be added in the pools, if the grooves are immersed in the material.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the technical spirit for the light transmission controlling apparatus is employed while the light source 300 and/or the image display unit 320 can be also replaced with other ones, which are not described above. Further, the groove G can be provided to have various sections of semicircular shape, V-shape, semi-rectangular shape and the like. Furthermore, in the inventive first controlling apparatus, the entire lower substrate 52 can be used as the groove portion 56, and the light-screen material storing part 54 and the light-transmission material storing part 58 can be provided at the external of the lower substrate 52. Additionally, a single substrate with a predetermined thickness, which functions as the upper and lower substrates, can also include the light-screen material storing part, the light-transmission material storing part and the groove portion.

What is claimed is:

1. A light transmission controlling apparatus comprising:
 a transparent substrate which has first regions at a predetermined interval, the first regions allowing light to always transmit therethrough;

a light screen material and a light transmission material which are separated from each other in the transparent substrate and shift back and forth in intervals between the first regions; and a control unit which controls the shift of the light screen material and the light transmission material.

2. The apparatus of claim 1, wherein the transparent substrate is comprised of an upper substrate and a lower substrate.

3. The apparatus of claim 1, wherein the light screen material is a light absorption material.

4. The apparatus of claim 1, wherein a groove is provided as the interval between the transparent regions, the groove having a larger width than the transparent regions and allowing the light screen material and the light transmission material to be shifted thereat.

5. The apparatus of claim 4, wherein a first pool is provided in the transparent substrate, the first pool storing the light screen material and being connected to one end of the groove.

6. The apparatus of claim 5, wherein a second pool is provided in the transparent substrate, the second pool storing the light transmission material and being connected to the other end of the groove.

7. The apparatus of claim 6, wherein at least one of the first and second pools is divided into a plurality of pools.

8. The apparatus of claim 6, wherein the first and second pools face with each other across the transparent regions.

9. The apparatus of claim 6, wherein the first and second pools are provided at the same side of the transparent regions.

10. The apparatus of claim 1, wherein the transparent substrate is a glass substrate or a polymer substrate.

11. The apparatus of claim 6, wherein the groove is one continuous, zigzag-shaped groove.

12. The apparatus of claim 2, wherein the lower substrate comprises a first pool for storing the light screen material and a second pool for storing the light transmission material, the transparent regions are provided at the lower substrate between the first and second pools, and a groove having one end connected to the first pool and the other end connected to the second pool is provided between the transparent regions.

13. The apparatus of claim 2, wherein the lower substrate comprises the first pool for storing the light screen material and the second pool for storing the light transmission material, the transparent regions are provided at the upper substrate corresponding between the first and second pools, and the groove having one end connected to the first pool and the other end connected to the second pool is provided between the transparent regions.

14. The apparatus of claim 12, wherein the first and second pools are provided at one side of the transparent regions.

15. The apparatus of claim 13, wherein the first and second pools are provided at one side of the transparent regions.

16. The apparatus of claim 12, wherein at least one of the first and second pools is divided into a plurality of pools.

17. The apparatus of claim 13, wherein at least one of the first and second pools is divided into a plurality of pools.

18. The apparatus of claim 12, wherein the groove is one continuous, zigzag-shaped groove.

19. The apparatus of claim 13, wherein the groove is one continuous, zigzag-shaped groove.

20. The apparatus of claim 1, wherein the control unit comprises a shift body and a knob connected to the shift body, and the shift body is provided between the light screen material and the light transmission material.

21. The apparatus of claim 2, wherein the control unit is provided at the lower substrate and comprises a shift body and a knob connected to the shift body, and the shift body is provided between the light screen material and the light transmission material.

22. The apparatus of claim 1, wherein the control unit is provided at the external of the transparent substrate, and comprises a first pressurizing unit which pressurizes the light screen material; a second pressurizing unit which pressurizes the light transmission material; and a driving-force transmitting unit which connects the first and second pressurizing units with each other and which transmits driving force generated from any one of the first and second pressurizing units to the other pressurizing unit.

23. The apparatus of claim 2, wherein the control unit is disposed adjacent to the upper substrate or the lower substrate, and comprises a first pressurizing unit which pressurizes the light screen material; a second pressurizing unit which pressurizes the light transmission material; and a driving-force transmitting unit which connects the first and second pressurizing units with each other, and which transmits the driving force generated from any one of the first and second pressurizing units to the other pressurizing unit.

24. The apparatus of claim 22, wherein the first pressurizing unit is comprised of a first rotary roller and a first cam that is moved with the first rotary roller.

25. The apparatus of claim 23, wherein the first pressurizing unit is comprised of a first rotary roller and a first cam that is moved with the first rotary roller.

26. The apparatus of claim 22, wherein the second pressurizing unit is comprised of a second rotary roller and a second cam that is moved with the second rotary roller.

27. The apparatus of claim 23, wherein the second pressurizing unit is comprised of a second rotary roller and a second cam that is moved with the second rotary roller.

28. The apparatus of claim 22, wherein the driving-force transmitting unit is a belt.

29. The apparatus of claim 23, wherein the driving-force transmitting unit is a belt.

30. The apparatus of claim 1, wherein a gap material is provided between the light transmission material and the light screen material.

31. The apparatus of claim 2, wherein a gap material is provided between the light transmission material and the light screen material.

32. A 2D and 3D image display apparatus comprising:

an image display unit; and a light source unit having a light transmission controlling apparatus which controls light incident on the image display unit to be light for 2D or 3D image, and a light source which irradiates light into the light transmission controlling apparatus, wherein the light transmission controlling apparatus has a transparent substrate which has transparent regions at a predetermined interval, the transparent regions allowing light to always transmit therethrough; a light screen material and a light transmission material which are independently provided in the transparent substrate and shift between the transparent regions; and a control unit which controls the shift of the light screen material and the light transmission material.

33. The apparatus of claim 32, wherein the transparent substrate includes an upper substrate and a lower substrate.

34. The apparatus of claim 32, wherein the light screen material is a light absorption material, and the light transmission material is material having the same optic property as the transparent substrate.

35. The apparatus of claim 32, wherein a groove is provided between the transparent regions, the groove allowing the light screen material and the light transmission material to be shifted thereat.

36. The apparatus of claim 35, wherein the transparent substrate has a second pool that stores the light screen material thereat, and is connected to one end of the groove.

37. The apparatus of claim 36, wherein the transparent substrate has a second pool that stores the light transmission material thereat, and is connected to the other end of the groove.

38. The apparatus of claim 37, wherein at least one of the first and second pools is divided into a plurality of pools.

39. The apparatus of claim 37, wherein the first and second pools face each other across the groove.

40. The apparatus of claim 37, wherein the first and second pools are provided at the same side of the groove.

41. The apparatus of claim 32, wherein the transparent substrate is a glass substrate or a polymer substrate.

42. The apparatus of claim 37, wherein the groove is one contiuous, zigzag-shaped groove.

43. The apparatus of claim 33, wherein the lower substrate comprises a first pool for storing the light screen material and a second pool for storing the light transmission material, the transparent regions are provided at the lower substrate between the first and second pools, and a groove having one end connected to the first pool and the other end connected to the second pool is provided between the transparent regions.

44. The apparatus of claim 33, wherein the lower substrate comprises a first pool for storing the light screen material and a second pool for storing the light transmission material, the transparent regions are provided at the upper substrate corresponding between the first and second pools, and the groove having one end connected to the first pool and the other end connected to the second pool is provided between the transparent regions.

45. The apparatus of claim 43, wherein the first and second pools are provided at one side of the transparent regions.

46. The apparatus of claim 44, wherein the first and second pools are provided at one side of the transparent regions.

47. The apparatus of claim 43, wherein the first and second pools face each across on the groove.

48. The apparatus of claim 44, wherein the first and second pools face each other across the groove.

49. The apparatus of claim 43, wherein at least one of the first and second pools is divided into a plurality of pools.

50. The apparatus of claim 44, wherein at least one of the first and second pools is divided into a plurality of pools.

51. The apparatus of claim 43, wherein one continuous, zigzag-shaped groove is provided between the first and second pools.

52. The apparatus of claim 44, wherein one continuous, zigzag-shaped groove is provided between the first and second pools.

53. The apparatus of claim 32, wherein the control unit comprises a shift body and a knob connected to the shift body, and the shift body is provided between the light screen material and the light transmission material.

54. The apparatus of claim 33, wherein the control unit is provided at the lower substrate and comprises a shift body and a knob connected to the shift body, and the shift body is provided between the light screen material and the light transmission material.

55. The apparatus of claim 32, wherein the control unit is provided at the external of the transparent substrate, and comprises a first pressurizing unit which pressurizes the light screen material; a second pressurizing unit which pressurizes the light transmission material; and a driving-force transmitting unit which connects the first and second pressurizing units with each other and which transmits driving force generated from any one of the first and second pressurizing units to the other pressurizing unit.

56. The apparatus of claim 33, wherein the control unit is disposed adjacently to the upper substrate or the lower substrate, and comprises a first pressurizing unit which pressurizes the light screen material; a second pressurizing unit which pressurizes the light transmission material; and a driving-force transmitting unit which connects the first and second pressurizing units with each other and which transmits the driving force generated from any one of the first and second pressurizing units to the other pressurizing unit.

57. The apparatus of claim 55, wherein the first pressurizing unit is comprised of a first rotary roller and a first cam that is moved by the first rotary roller.

58. The apparatus of claim 56, wherein the first pressurizing unit is comprised of a first rotary roller and a first cam that is moved by the first rotary roller.

59. The apparatus of claim 55, wherein the second pressurizing unit is comprised of a second rotary roller and a second cam that is moved by the second rotary roller.

60. The apparatus of claim 56, wherein the second pressurizing unit is comprised of a second rotary roller and a second cam that is moved by the second rotary roller.

61. The apparatus of claim 55, wherein the driving-force transmitting unit is a belt.

62. The apparatus of claim 56, wherein the driving-force transmitting unit is a belt.

63. The apparatus of claim 32, wherein a gap material is provided between the light transmission material and the light screen material.

64. The apparatus of claim 33, wherein the gap material is provided between the light transmission material and the light screen material.

65. A method of manufacturing a light transmission controlling apparatus, the method comprising:
  defining a light-screen material storing part, a groove part and a light-transmission material storing part in a transparent lower substrate;
  respectively forming first and second pools in the light-screen material storing part and the light-transmission material storing part, and forming a groove in the groove part, which has one end connected to the first pool and the other end connected to the second pool, at a predetermined interval;
  covering the light-screen material storing part, the groove part and the light-transmission material storing part with a transparent upper substrate;
  respectively filling the first and second pools with the light screen material and the light transmission material; and
  installing a control unit for controlling the shift of the light screen material and the light transmission material at the front of the upper substrate.

66. The method of claim 65, wherein the first and second pools and the groove are formed using one of a photolithography process, a mechanical grinding process and an imprinting process.

67. The method of claim 65, wherein the groove is formed only one continuous groove having a zigzag shape.

68. The method of claim 65, wherein at least one of the first and second pools is divided into a plurality of pools.

69. The method of claim 65, wherein the first and second pools are provided at one side of the groove.

70. The method of claim 65, wherein the control unit comprises:

a first pressurizing unit which pressurizes the light screen material;

a second pressurizing unit which pressurizes the light transmission material; and a driving-force transmitting unit which connects the first and second pressurizing units with each other and which transmits driving force generated from any one of the first and second pressurizing units to the other pressurizing unit.

71. The method of claim 65, wherein the groove has a larger width than an interval between the grooves.

* * * * *